May 23, 1961     A. DOBRY     2,985,706
REMOVAL OF OXIDATION CATALYSTS FROM OIL
DIELECTRICS IN INDUCTIVE APPARATUS
Filed Sept. 13, 1957     2 Sheets-Sheet 1

INVENTOR
Alan Dobry

BY

ATTORNEY

United States Patent Office 2,985,706
Patented May 23, 1961

2,985,706
REMOVAL OF OXIDATION CATALYSTS FROM OIL DIELECTRICS IN INDUCTIVE APPARATUS

Alan Dobry, Chicago, Ill., assignor to Westinghouse Electric Corporation, East Pittsburgh, Pa., a corporation of Pennsylvania Filed Sept. 13, 1957, Ser. No. 683,763
1 Claim. (Cl. 174—14)

The invention relates generally to reducing the oxidation of oils and more particularly to materials for removing copper and iron from the oil to prevent their catalytic effect in the oxidation of the oil.

In the use of inductive apparatus, particularly transformers, the cooling oil circulates in contact with the copper and iron members aund dissolves a certain amount of these metals which metals in solution have a catalytic effect hastening the oxidation of the oil. Antioxidants, such for example as di-tertiary butyl p-cresol, have been employed in small amounts in the oils to delay oxidation of the oil. However, such antioxidants become used up rapidly in the process of operation. When the inhibitor is ineffective, the oil oxides and sludges.

The object of the invention is to provide for removing from the cooling oil employed in conjunction with inductive apparatus any copper and iron which is dissolved by the oil, which metal would accelerate oxidation of the oil.

It is also an object of the invention to provide an acidic cation exchange resin in contact with oils which removes from the oils any dissolved metals which have a catalytic effect and which has a relatively long active life and which can be regenerated to continue the cleansing process indefinitely.

Other objects of the invention will, in part, be obvious and will, in part, appear hereinafter. The invention accordingly comprises a product possessing the features, properties, and the relation of components which will be exemplified in the product hereinafter described and the scope of the application of which will be indicated in the claim.

For a fuller understanding of the nature of the objects of the invention, reference should be had to the following detailed description taken in connection with the accompanying drawings, in which.

Figure 1:
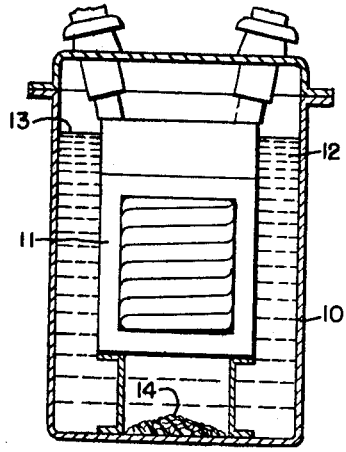
Figure 1 is a view partly in section and partly in side elevation of a transformer showing an ion exchange resin disposed in the transformer container where it may be contacted by the oil.

Referring now to the drawings and particularly to Fig. 1, a transformer case 10 is illustrated in which core and coils 11 are mounted. As it is well known, the core, coils and frame structure of a transformer are made up of silicon iron, copper conductors and iron members. The buses leading from the coils are generally bare copper.

Refined petroleum oil is commonly employed as a cooling dielectric in transformers or other inductive apparatus. In this instance, the oil 12 is shown filling case 10 up to line 13. There is usually sufficient oil to immerse the core and coils.

It is known in the operation of transformers that the oil will become oxidized due to oxygen and/or moisture being unavoidably present in the transformer case and entering during use of the transformer. Such oxidation products lower the insulating qualities of the oil. Further, some of the products of oxidation comprise sludges and solid matter which become deposited on both the copper and iron and retard the dissipation of heat. Therefore, it is highly desirable that some method be employed or product be provided in the oil which greatly reduces the rate of oxidation or prevents or substantially prevents the oxidation of the oil.

It has been found that the oxidation of the oil is accelerated by the presence of copper and iron, particularly when the metal is in solution in the oil. The copper and iron exhibit a catalytic effect which accelerates the oxidation of the oil. Consequently, if copper and iron can be removed and kept out of solution in the oil, oxidation will be reduced greatly. It is also desirable to provide for retarding the oxidation of the oil after the copper and iron has been removed.

It has been found in the operation of transformers that the oil will dissolve a certain amount of the copper and iron. The taking of copper into solution by the oil is normally more pronounced when the copper is bare, that is, without varnish or other applied insulation. The iron, such as the magnetic core and casing, is usually bare, however, it is found that the iron is not as readily dissolved as is copper. Further, iron does not have as pronounced a catalytic effect as does copper.

The present invention involves the contacting of the oil with a strongly acidic type cation exchange resin in hydrogen form. The acidity must be stronger than obtainable with carboxyl ion exchange resins. This exchange resin is employed in a granulated form and has an affinity for the copper and iron in the oil. Particularly good results have been obtained with a sulfonic acid type of cation exchange resin. A suitable resin of this type is set forth in an article entitled "Ion Exchange" in the October 1954 issue of Chemical Engineering, see Fig. 1 on page 163, comprising sulfonated styrene crosslinked with divinyl benzene.

The strongly acidic cation exchange resin may be employed in different ways. As shown in Fig. 1, a mass 14 of the resin may be deposited in the bottom of the case 10 where it may readily be contacted by the oil during the operation of the transformer. As is well known, the transformer oil is heated to different temperatures in different parts of the transformer case and flow currents are set up. Therefore, the oil will, to a substantial extent, circulate and come in contact with the mass 14 of resin in the bottom of the case.

Figure 2:
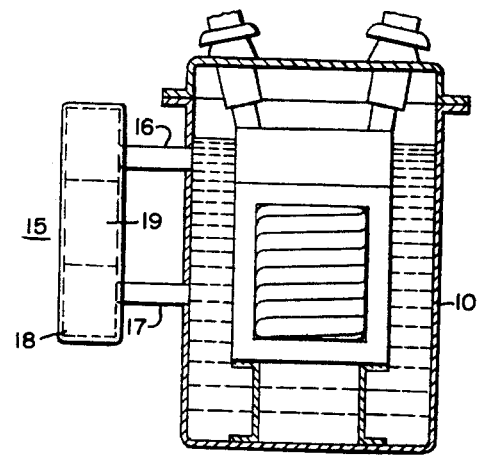
Fig. 2 is a view partly in section and partly in side elevation of a transformer provided with a thermosyphon in which the ion exchange resin is disposed as a bed through which the oil flows.

In the operation of inductive apparatus employing oil as the cooling medium, there may be a certain amount of atmospheric moisture getting into the oil or water may be produced by the oxidation of the oil and it is highly desirable that this water be removed. It is usual practice to provide for removing the water by means of a thermosyphon device shown generally at 15 in Fig. 2. The thermosyphon device is connected to the transformer case 10 by means of pipes 16 and 17. In view of the thermosyphon effect caused by the heating of the oil in the transformer, there is a circulation through the thermosyphon device 15 and the water is removed by a bed 18 of activated clay, silica gel, activated alumina or other water absorbent.

In a modification of the invention, a bed 19 of the sulfonic cation exchange resin is provided in the thermosyphon device 15 in conjunction with the bed 18 of activated clay. Therefore, in the operation of the transformer, due to the thermosyphon effect, oil is circulated through the beds of sulfonic cation exchange resin and the activated clay. The bed 19 of sulfonic cation exchange resin will remove the copper and iron from the oil and greatly reduce the rate of oxidation thereof.

It will be understood that other acids such as phosphoric acid can be applied to form the acidified cation exchange resin besides sulfonic acid. Thus, the acidic cation exchange resin may be present both in the oil in the transformer tank and also in the thermosyphon as a bed through which the oil will flow.

Figure 3:
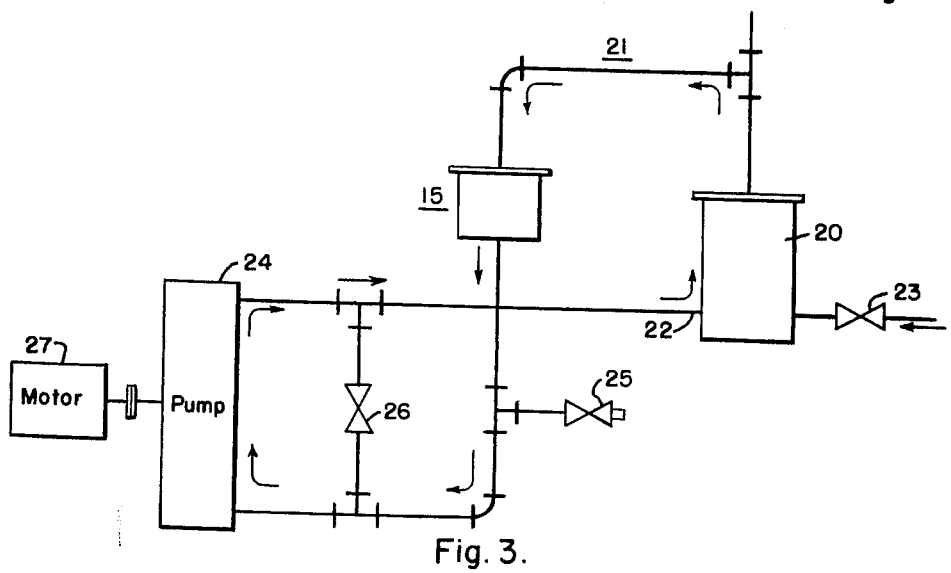
Fig. 3 is a view partly in side elevation and partly in section showing apparatus for testing the acidic ion exchange resin of this invention to show its utility.

Many tests have been made to determine the value of sulfonic cation exchange resin as an antioxidant. In making these tests an apparatus such as shown in Fig. 3 was employed. As shown, a container 20 is provided containing oil in which is present a predetermined amount of copper and iron. The upper part of the container 20 is connected through pipes and couplings shown generally at 21 to a thermosyphon 15. Piping 22 is connected to the lower part of the container 20 for delivering the oil to be circulated. In addition, a valved inlet 23 is provided in the lower part of the container 20 for supplying air or air and oxygen. A pump 24 is connected in the system for causing circulation of the oil. A tap 25 for taking off a certain amount of oil for examination, is connected into the system below the thermosyphon 15. A regulating valve 26 is connected between the pipe lines leading to and from the pump to regulate the flow of oil. The pump 24 may be driven by any suitable means, preferably by a variable speed electric motor 27.

Many tests have been run using the apparatus of Fig. 3, to establish the utility of the sulfonic type cation exchange resin as an antioxidant. However, it will suffice to give one example and the results obtained.

In one test, 4500 millilitres of a good grade petroleum transformer oil was introduced into the tank 20 along with 3 meters of No. 18 A.W.G. copper wire and 3 meters of iron wire. Oxygen was introduced into the tank at the rate of 3 litres per hour. The motor was run at an adequate speed to keep the oil in circulation, and the whole system was maintained at a temperature of 95° C. In this manner, conditions were established which fairly accurately simulate the conditions under which oil is used in a transformer or other inductive apparatus, but, of course, the conditions greatly accelerate the processes that occur.

During the tests, small samples of the oil were drawn off periodically through the tap 25 and tested. The dates on the left of the following Table I show the dates on which the tests were made, and the column second from the right shows the number of hours that the oil was exposed to the conditions already described.

The interfacial tension of the oil was tested in the well-known manner. The condition of the oil was determined by visual examination, and the acid neutralization number was checked by standard chemical procedures. After the last check was made, the power factor of the oil was checked and the value of 0.481% was quite satisfactory.

In the thermosyphon 15 a bed of sulfonated polystyrene cation exchange resin in hydrogen form was employed. It was dried over night at 150° C. before the test run was started.

The amount of sulfonated polystyrene cation exchange resin employed was about 1% by weight of the amount of oil. Of course, it was not employed in conjunction with activated clay as described in the modification shown in Fig. 2.

Table I

| Date | Neutralization No. | Interfacial Tension | Condition | Hours | Catalyst |
|---|---|---|---|---|---|
| 9-27-56 | .02 | 50.2 | Clear | 0 | 3 meters copper and 3 meters steel wire. |
| 10-3-56 | .016 | 42.6 | do | 144 | Do. |
| 10-10-56 | .03 | 38.0 | do | 312 | Do. |
| 10-15-56 | .03 | 34.4 | do | 432 | Do. |
| 10-20-56 | .06 | 32.2 | do | 545 | Do. |
| 10-25-56 | .09 | 29.0 | do | 665 | Do. |
| 10-31-56 | .13 | 22.2 | do | 809 | Do. |
| 11-12-56 | .18 | 18.5 | do | 1,097 | Do. |
| 11-16-56 | .21 | 16.2 | do | 1,187 | Do. |
| 11-20-56 | .22 | 17.8 | do | 1,289 | Do. |
| 11-29-56 | .30 | 16.4 | do | 1,499 | Do. |
| 12-6-56 | .36 | 14.2 | do | 1,667 | Do. |
| 12-6-56 | | | Oil Power factor=.481 | | |

Figure 4:
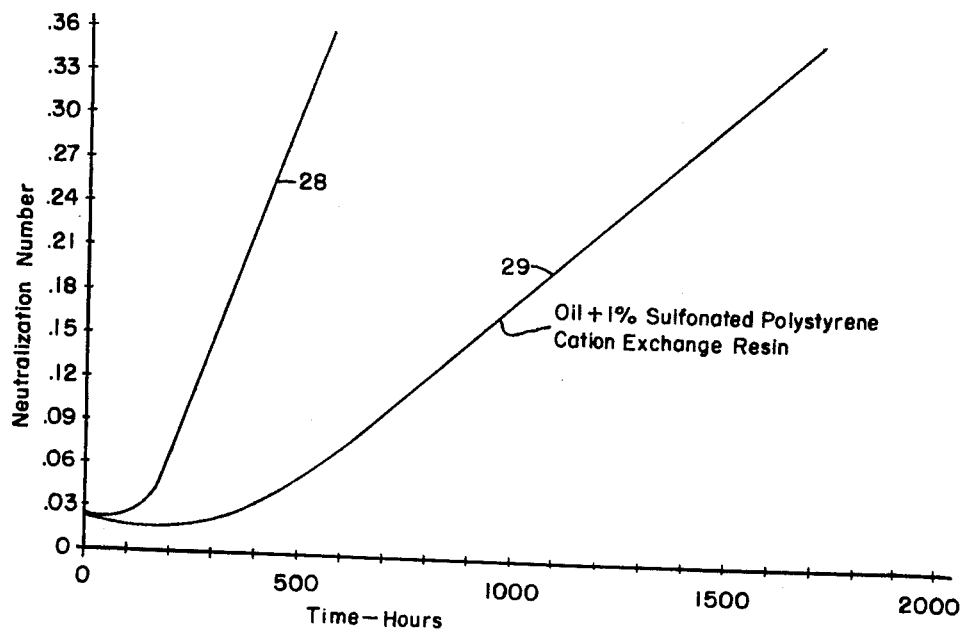
Figs. 4 and 5 are graphs showing the effectiveness of this invention.

The graph in Fig. 4 shows the comparison between oil treated without a sulfonic type cation exchange resin with the results obtained in the test. It will be observed that in the graph 28 that the neutralization number increased rapidly for oil which was not being conditioned by a sulfonic cation exchange resin, while in graph 29 the neutralization number increased very slowly in comparison when the oil was continuously subjected to contact with the sulfonic cation exchange resin.

Figure 5:
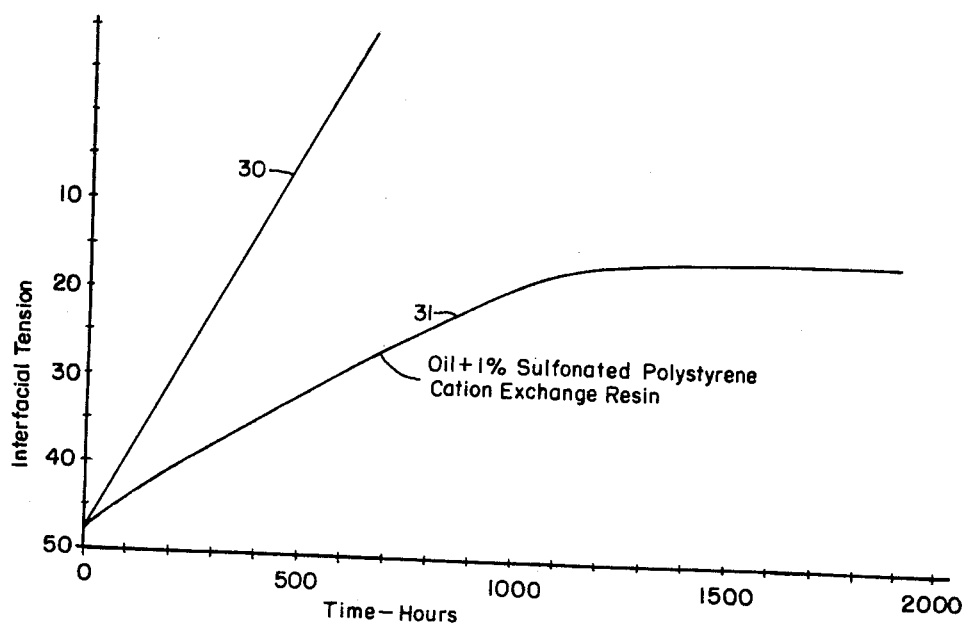

The graph 30 of Fig. 5 prepared for oil without the benefit of a cation exchange resin to show the interfacial tension characteristics, while the graph 31 shows how the interfacial tension characteristic leveled off during the use of the sulfonic cation exchange resin for conditioning the oil. The difference results from the difference in the amount of the oxidation of oil.

From the foregoing it will be evident that the regular use of an acidic cation exchange resin in conjunction with oils for inductive apparatus so conditions the oil that oxidation is retarded and the oil has a much longer life and the apparatus operates more efficiently. The cation exchange resin is not wasted and can be regenerated by acidification. Its use adds greatly to the useful life of all apparatus of this type in which oil is employed.

Tests have indicated the superiority of this invention in reducing the oxidation of oil as compared to chemical antioxidants such as ditertiary butyl-para-cresol. Thus, a refined petroleum oil at 120° C. in contact with copper required four days to reach a given amount of oxidation. With 0.25% by weight of di-tertiary butyl-para-cresol in the oil, it required nine days to reach the same amount of oxidation. With 0.25% of sulfonic type ion exchange resin (Amberlite IR-112) and circulation through a bed of the same granular resin, it took fourteen days to reach the same amount of oxidation. This increase in oxidation resistance is quite important and useful.

It is evident that acidic cation exchange resins can be introduced into lubricating systems where oil is circulated and subjected to oxidation. If the metals dissolved in the oil are removed, there will be little oxidation, and the life of the lubricating oils will be greatly extended.

Since certain changes may be made in carrying out the above process without departing from the scope of the invention, it is intended that all matter contained in the above description shall be interpreted as illustrative and not in a limiting sense.

I claim as my invention:

In inductive apparatus provided with an oil for cooling purposes, and copper and iron members both of which may be dissolved in oil to some extent, a thermosyphon filter apparatus connected to the inductive apparatus for circulating the oil therethrough, a bed of a sulfonated polystyrene cation exchange resin in hydrogen form and a solid water absorbent selected from the group consisting of activated clay, silica gel, and activated alumina through which the oil is caused to circulate disposed in the thermosyphon filter, the acidic cation exchange resin in hydrogen form cooperating with the solid water absorbent to remove both water and the copper and iron from the oil to cleanse the latter and reduce the oxidation of the oil.

References Cited in the file of this patent

UNITED STATES PATENTS

| | | | |
|---|---|---|---|
| 1,548,733 | Moody | Aug. 4, | 1925 |
| 2,375,694 | Schutze | May 8, | 1945 |
| 2,399,192 | Alexander | Apr. 30, | 1946 |
| 2,405,853 | Rosch | Aug. 13, | 1946 |
| 2,440,784 | Perdew | May 4, | 1948 |
| 2,566,353 | Mills | Sept. 4, | 1951 |
| 2,631,127 | D'Alelio | Mar. 10, | 1953 |